3,180,862
ARYL SULFONIC ACID SALTS OF ALPHA-
AMINOBENZYLPENICILLINS
Herbert H. Silvestri, De Witt, and David A. Johnson,
Fayetteville, N.Y., assignors to Bristol-Myers Company,
New York, N.Y., a corporation of Delaware
No Drawing. Filed Oct. 29, 1962, Ser. No. 233,943
15 Claims. (Cl. 260—239.1)

This invention relates to new synthetic compounds of value as antibacterial agents, as nutritional supplements in animal feeds, as agents for the treatment of mastitis in cattle, as therapeutic agents in poultry and animals, including man, in the treatment especially of infectious diseases caused by Gram-positive and Gram-negative bacteria, and as intermediates in the production of alpha-aminophenylmethyl and alpha-amino-substituted-phenylmethyl penicillins. This invention further relates to a process for the isolation of alpha-aminophenylmethyl and alpha-amino-substituted-phenylmethyl penicillins from impure reaction mixtures containing said penicillins.

Antibacterial agents such as benzylpenicillin have proved highly effective in the past in the therapy of infections due to Gram-positive bacteria, but such agents suffer from the serious drawbacks of being ineffective against numerous strains of bacteria, e.g., most Gram-negative bacteria. The compounds of the present invention are particularly useful in that they possess potent antibacterial activity against both Gram-positive and Gram-negative bacteria upon either parenteral or oral administration and also exhibit resistance to destruction by acid.

α-Aminobenzylpenicillin and α-amino-substituted-benzylpenicillins are known in the technical literature, having been described, for example, in United States Patent No. 2,985,648, the disclosure of which is incorporated herein by reference. According to the teachings of that patent, the penicillins are prepared by reaction of 6-aminopenicillanic acid with an acylating agent such as the acid chloride, acid bromide, acid anhydride, mixed anhydride, etc. of a derivative of α-aminophenylacetic or α-amino-substituted-phenylacetic acid in which the amino group is protected by a carbobenzoxy or other suitable protecting group. After completion of the acylation reaction, the protecting group is removed from the amino group such as by reaction with hydrogen in the presence of a catalyst.

The known methods for the preparation of α-aminobenzylpenicillins and α-amino-substituted benzylpenicillins by the acylation of 6-aminopenicillanic acid result in the preparation of mixtures which contain, in addition to the desired penicillin, unreacted 6-aminopenicillanic acid, hydrolyzed acylating agent, and products of side reactions such as the products of the acylating agent reacted with itself and/or with the desired penicillin. Because these compounds may have similar solubility characteristics in various media, it is often difficult to isolate the desired penicillin from the other reaction products.

Accordingly, it is an object of this invention to provide an improved process for the recovery of α-aminobenzylpenicillin and α-amino-substituted-benzylpenicillins from mixtures thereof with other reaction products obtained by the acylation of 6-aminopenicillanic acid with an acylating derivative of α-aminophenylacetic or α-amino-substituted-phenylacetic acid. It is a further object of this invention to provide a new group of aryl sulfonic acid salts of α-aminobenzylpenicillin and α-amino-substituted-benzylpenicillin.

Hereinafter, the term "an α-aminobenzylpenicillin" is intended to include α-amino-substituted-benzylpenicillins as well as α-aminobenzylpenicillin per se. Similarly, the term "an α-aminophenylacetic acid" is intended to include α-amino-substituted phenylacetic acid as well as α-aminophenylacetic acid per se.

These, and other objects are achieved by the practice of this invention which, briefly, comprises providing an aqueous solution containing an α-aminobenzylpenicillin selected from the group consisting of the acids having the formula

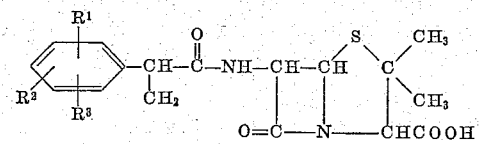

Formula I wherein $R^1$, $R^2$ and $R^3$ each represents a member selected from the group consisting of hydrogen, nitro, di(lower)-alkylamino, (lower)alkanoylamino, (lower)alkanoyloxy, (lower)alkyl, (including straight and branched chain saturated aliphatic groups having from 1 to 6 carbon atoms inclusive), (lower)alkoxy, sulfamyl, chloro, iodo, bromo, fluoro, trifluoromethyl, (lower)alkylthio, (lower)-alkylsulfonyl, carbo(lower)alkoxy, benzyl, phenethyl, cycloheptyl, cyclohexyl and cyclopentyl; and their sodium, potassium, calcium, aluminum and ammonium salts, their nontoxic substituted ammonium salts with an amine selected from the group consisting of trialkylamines, procaine, dibenzylamine, N-benzylbeta-phenethylamine, 1-ephenamine, N,N'-dibenzylethylenediamine, dehydroabietylamine, N,N'-bis-dehydroabietylethylenediamine, N-(lower)alkylpiperidine, and other amines which have been used to form salts of benzylpenicillin, as well as easily hydrolyzed esters or amides which may be converted to the free acid form by chemical or enzymatic hydrolysis. The aqueous solution containing the α-aminobenzylpenicillin of Formula I is contacted with a water-soluble aryl sulfonic acid or salt thereof having the formula ($R^4$—$SO_3$)$_x$M wherein M is a radical selected from the group consisting of hydrogen, ammonium, substituted ammonium, the alkali metals and the alkaline earth metals, wherein $x$ is a whole number equal to the valence of M and wherein $R^4$ represents a member selected from the group consisting of radicals having the formulae

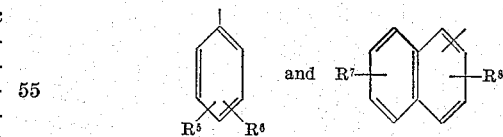

in which $R^5$, $R^6$, $R^7$ and $R^8$ are members selected from the group consisting of hydrogen, alkyl containing from 1 to 12 carbon atoms (including straight and branched chain groups), (lower)alkoxy, (lower)alkylthio, nitro, (lower)alkanoylamino, (lower)alkanoyloxy, sulfamyl, chloro, iodo, bromo, fluoro, trifluoromethyl, (lower)alkyl-sulfonyl, carbo(lower)alkoxy, benzyl, phenethyl, cycloheptyl, cyclohexyl and cyclopentyl. The pH of the solution is adjusted to within the range of from about 1.5 to 3.5. A reaction product of said α-aminobenzylpenicillin and said aryl sulfonic acid is thereby formed. This reaction product is then recovered from the aqueous medium.

There is provided, according to the practice of this invention, a member selected from the group consisting of an acid salt having the formula

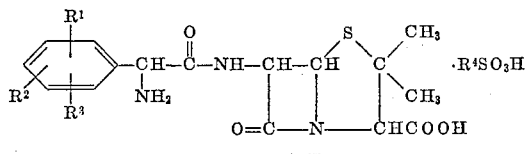

Formula II wherein $R^1$, $R^2$, $R^3$ and $R^4$ have the meaning set forth above. Also included within the scope of this invention are easily hydrolyzed esters or amides which are converted to the free acid form by chemical or enzymatic hydrolysis. Also included within the scope of this invention are the hydrates of these compounds as well as the anhydrous compounds.

The α-carbon atoms of the acyl group (to which the amine sulfonate salt group is attached) is an asymmetric carbon atom and the compounds of this invention can therefore exist in two optically active isomeric forms (the D- and L-diastereoisomers), as well as in a mixture of the two optically active forms; all such isomeric forms of the compounds are included within the scope of the present invention.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic nucleus. Such additional isomers, however, are not presently significant since 6-aminopenicillanic acid, which is the product of fermentation processes, is consistently of one configuration; such 6-aminopenicillanic acid is presently used in the production of the compounds of this invention.

The aqueous solution containing an α-aminobenzylpenicillin as defined in Formula I, above, may be obtained by dissolving a crystalline α-aminobenzylpenicillin in water. However, the maximum advantages of this invention are attained by using an impure solution containing an α-aminobenzylpenicillin. Typically, the aqueous solution containing an α-aminobenzylpenicillin is obtained by the acylation of 6-aminopenicillanic acid with an appropriate acylating agent, such as described in United States Patent No. 2,985,648, or by hydrogenation of an α-azidobenzylpenicillin. This reaction mixture may contain, in addition to the desired α-aminobenzylpenicillin, unreacted 6-aminopenicillanic acid and hydrolysis or side reaction products of the acylating agents. Other compounds, such as 2-benzylidene-4-phenyl-3-oxazolin-5-one or its aryl substituted analogs, are also frequently present as impurities. The solution containing the α-aminobenzylpenicillin may also be the mother liquor remaining after the recrystallization of an α-aminobenzylpenicillin.

It is preferred that the solution contain from 25 to 100 mg. of an α-aminobenzylpenicillin per ml. of solution. If necessary, the solution may be concentrated by placing the solution under a partial vacuum at a temperature of from 30–40° C. for several minutes.

If the aqueous solution containing an α-aminobenzylpencillin also contains organic impurities such as in the reaction mixture obtained by acylating 6-aminopenicillanic acid, an organic solvent, preferably methyl isobutyl ketone, is added to the solution. Other solvents which may be used include other (lower)ketones, (lower)aliphatic esters such as butyl acetate, halogenated (lower)-hydrocarbons such as methylene chloride, aromatic hydrocarbons such as toluene and mixtures thereof with each other or with methyl isobutyl ketone. Generally, any water immiscible solvent may be used. The presence of the solvent facilitates crystallization and results in a purer product. The volume ratio of the organic solvent to the aqueous phase is not critical. Thus, for every volume of water present, there may also be present as much as two volumes or more of the organic solvent or less than 1/10 volume of the organic solvent.

Specific aryl sulfonic acids which may be used in accordance with the practice of this invention include naphthalene sulfonic acid, p-nonylbenzene sulfonic acid, p-toluene sulfonic acid and p-cymene sulfonic acid. The aryl sulfonic acids which may be used are described in the prior art and many of them are commercially available. It is preferred to use a concentrated aqueous solution of the free acid although the water-soluble ammonium or substituted ammonium, alkali metal and alkaline earth metal salts of these acids may also be used. Preferably, from about 1 to about 2 moles of the aryl sulfonic acid are used per mole of the α-aminobenzylpenicillin in the solution.

The aryl sulfonic acid is generally contacted with the aqueous solution containing an α-aminobenzylpenicillin at low temperatures, i.e., at temperatures between about 0–10° C., in order to minimize decomposition of the product and losses of the solution as well as to hasten the crystallization of the product. The pH of the solution during the formation of the aryl sulfonic acid salt of the α-aminobenzylpenicillin should be within the range of from about 1.5 to 3.5. The pH of the solution may be higher than 3.5, for example about 4.5, during the addition of the aryl sulfonic acid. However, the desired salt will not form until the pH is within the range of from 1.5 to 3.5; the preferred pH range is 1.5 to 2.0. If the pH is not brought to within the range of from about 1.5 to 3.5 by the addition of the aryl sulfonic acid, mineral acid such as HCl or $H_2SO_4$ may be added to adjust the pH.

Crystallization of the aryl sulfonic acid salt of the α-aminobenzylpenicillin may be initiated, if necessary, by seeding. After precipitation of the product is completed, it is recovered by any suitable means, such as by filtration. The product may then be washed with water and/or an organic solvent such as methyl isobutyl ketone and subsequently dried. The resultant products are generally recovered as hydrates of the aryl sulfonic acid salts.

In a preferred embodiment of this invention, the hydrate of the aryl sulfonic acid salt of the particular α-aminobenzylpenicillin is converted to the anhydrous form. This may be accomplished by slurrying the hydrate in a large volume of dry acetone (i.e., about 10 ml. of acetone per gram of hydrate). The amount of the acetone used should be such that there will be less than 2% by weight of water in the acetone slurry after the hydrate (which may be wet to begin with) is slurried in the acetone. The slurry is then stirred for about three hours at about 25 to 30° C., filtered, the filter cake washed with about five volumes of acetone and dried at about 50° C. By this procedure, products of very high purity (i.e. greater than 95% purity) may be obtained. Moreover, the resultant anhydrous products tend to be more heat stable than the corresponding hydrate.

Since the aryl sulfonic acid salts of an α-aminobenzylpenicillin produced in accordance with the practice of this invention (either the hydrate or anhydrous form) possess valuable anti-bacterial properties, they may be used directly as therapeutic agents. They possess about the same activity against both Gram-positive and Gram-negative bacteria upon either parenteral or oral administration as do the corresponding α-aminobenzylpenicillins. In their anhydrous form, these compounds are soluble in methanol, ethanol, formamide, dimethyl formamide and pyridine and are insoluble in other common solvents. Moreover, they are valuable intermediates for the production of the corresponding pure α-aminobenzylpenicillin.

An α-aminobenzylpenicillin aryl sulfonate may be converted to the corresponding α-aminobenzylpenicillin by suspending the aryl sulfonate in water and adjusting the pH of the suspension to from about 6.0–8.0 and preferably 6.7–7.2. The adjustment of the pH of the solution is preferably accomplished by the addition of a tertiary amine, such as triethylamine, preferably at about room temperature. Other alkaline materials, such as sodium hydroxide, ammonium hydroxide, potassium hydroxide, sodium carbonate, ammonium carbonate, potassium carbonate, etc., may also be used. The adjustment of the pH causes precipitation of the α-aminobenzylpenicillin to commence. The pH of the solution is then adjusted to about 4.5 to 4.6 by the addition of an acid such as HCl and cooled to complete precipitation. After precipitation of the α-aminobenzylpenicillin is completed, it may be recovered by filtration. The product may then be washed with water and/or an organic solvent such as methyl isobutyl ketone and dried.

By the practice of the process of this invention, much higher yields of an α-aminobenzylpenicillin from the reaction mixture in which the α-aminobenzylpenicillin has been prepared by the acylation of 6-aminopenicillanic acid may be obtained than has heretofore been possible in a large-scale operation. Moreover, the α-aminobenzylpenicillin is obtained in a higher state of purity than by previous processes.

The following examples illustrate the best modes contemplated for carrying out this invention.

*Example 1*

A reaction mixture containing α-aminobenzylpenicillin, formed by the acylation of 1 kg. of 6-aminopenicillanic acid, is concentrated at less than 40° C. to about 15 liters. Methyl isobutyl ketone (7.5 l.) is added to the concentrate which is then chilled to 0–5° C., adjusted to pH 1.8–2.0, agitated about five minutes, the resulting emulsion filtered and the filtrates collected. The filter cake is washed with two l. of cold water and then with 2.5 l. of methyl isobutyl ketone and these wash portions are combined with the filtrate. The aqueous layer and the methyl isobutyl ketone layer of the filtrate are then separated and the organic solvent layer is discarded. The aqueous layer is adjusted to pH 4–5 with triethylamine, maintained at 0–10° C. and mixed with 7.5 l. of methyl isobutyl ketone. To the resulting mixture there is added with vigorous agitation 3 l. of an aqueous solution containing 1.35 kg. of β-naphthalene sulfonic acid. During addition of the β-naphthalene sulfonic acid, the reaction mixture is not allowed to exceed 10° C. and the pH is maintained above 1.5 by intermittent addition of triethylamine as required. Following the addition of the acid solution, the pH of the reaction mixture is adjusted to 1.6–2.0, seeded, and agitated for 2 to 4 hours at 0 to 5° C. and at a pH of 1.6 to 2.0 whereupon α-aminobenzylpenicillin·β-naphthalene sulfonic acid salt precipitates. After precipitation of the product is completed, the reaction mixture is filtered and the collected product washed twice with 2.5 l. of cold water and with three successive washes of 2.5 l. of methyl isobutyl ketone. The collected product, the monohydrate of β-naphthalene sulfonic acid salt of α-aminobenzylpenicillin is dried at 50° C. and found by bioassay to have 600 mcg. α-aminobenzylpenicillin activity/mg. The theoretical activity of α-aminobenzylpenicillin·β-naphthalene sulfonic acid salt monohydrate is 606 mcg. α-aminobenzylpenicillin/mg. The product inhibits *Staph. aureus* Smith at concentrations of 0.001% by weight.

*Example 2*

A two hundred gram portion of α-aminobenzylpenicillin·β-naphthalene sulfonic acid salt (prepared as described in Example 1) is added with agitation to 1500 ml. of water at room temperature. Triethylamine (54 ml.) is added to the resulting suspension over a period of several minutes. Four successive 200 gm. portions of the salt are added to the suspension, each portion being followed by the addition of 54 ml. triethylamine and by agitation. Some pure α-aminobenzylpenicillin crystallizes out of the solution following each addition. The resulting slurry is agitated at room temperature (25–30° C.) at a pH of 6.7–7.5 for about one hour. Subsequently, the slurry is chilled and, while chilling, the pH is slowly adjusted over about a 10–30 minute period to about 4.5 to 4.6 by the addition of about 45 ml. 6 N hydrochloric acid. After the pH is adjusted, the slurry is agitated at 0 to 5° C. for about two hours and then filtered. The mother liquors are removed from the collected solids which are then washed with two 200 ml. portions of ice water and then with 1000 ml. of cold methyl isobutyl ketone. After washing, the collected product, α-aminobenzylpenicillin, is dried at 50° C. and found to weigh about 415 gm. and to assay 1000 mcg. α-aminobenzylpenicillin/mg. (100% of theoretical activity; 70% of theoretical yield).

The combined mother liquors and wash are chilled, acidified to pH 1.6 with 20% sulfuric acid, and maintained at from 0–5° C. for two hours and the α-aminobenzylpenicillin is recovered therefrom in the form of its β-naphthalene sulfonic acid salt in accordance with the procedure described in Example 1 above. The salt so recovered is then treated in accordance with the process of this example as described above. The over-all yield of α-aminobenzylpenicillin from the β-naphthalene sulfonic acid salt thereof is about 85% of theoretical yield.

*Example 3*

Water recrystallized α-aminobenzylpenicillin (2.0 g.) is dissolved in 50 ml. of water by adjusting the pH of the solution to 2.0. There are then added methyl isobutyl ketone (25 ml.) and the sodium salt of β-naphthalene sulfonic acid (1.26 g.). At first, an oil is formed and then crystallization occurs. The solution is filtered and the filter cake is washed first with water and then with methyl isobutyl ketone. The product is vacuum dried. There is obtained 1.9 g. of a compound which is determined by infra-red analysis to be the β-naphthalene sulfonic acid salt of α-aminobenzylpenicillin.

*Example 4*

α-Aminobenzylpenicillin (2.0 g.) is dissolved in 50 ml. of water by adjusting the pH of the solution to 2.0. There are added another 50 ml. of water followed by the dropwise addition of a solution of 1.36 g. of sodium β-naphthalene sulfonate in 15 ml. of water. Methyl isobutyl ketone is added (30 ml.) and the solution is stirred. Crystals are thereby formed which are recovered by filtration, washed and dried. The product (2.4 g.) is the β-naphthalene sulfonic acid salt of α-aminobenzylpenicillin.

*Example 5*

To 50 ml. of the acidified mother liquors (pH 2.0) from which α-aminobenzylpenicillin has been recrystallized, there are added 1.36 g. of sodium naphthalene sulfonic acid in 15 ml. of water and 25 ml. of methyl isobutyl ketone. An oil is formed followed by crystallization. The product is recovered by filtration, washed with water and methyl isobutyl ketone and dried under vacuum. The product (1.7 g.) is the β-naphthalene sulfonic acid salt of α-aminobenzylpenicillin.

*Example 6*

An aqueous mixture (1580 ml.) which has been formed by the acylation of 6-aminopenicillanic acid and which contains α-aminobenzylpenicillin and 2-benzylidene-4-phenyl-3-oxazolin-5-one is layered with methyl isobutyl ketone (300 ml.) and the pH of the mixture is adjusted to 2.3. The methyl isobutyl ketone layer is separated and discarded. Another 300 ml. of methyl isobutyl ketone is added to the aqueous phase and then a solution consisting of β-naphthalene sulfonic acid (16.0 g.) and concentrated H₂SO₄ (2.3 g.) in 50 ml. of water is added dropwise to the mixture while the pH of the mixture is maintained at from 1.8 to 2.0 by the periodic addition of NH₄OH. After ⅓ of the β-naphthalene sulfonic acid·H₂SO₄ solution is added, the mixture is seeded with α-aminobenzylpenicillin·β-naphthalene sulfonic acid and a crystalline product commences to form. The remainder of the β-naphthalene sulfonic acid·H₂SO₄ solution is added over a 20-minute period. The mixture is allowed to stand at room temperature for 30 minutes during which time crystallization of the product proceeds. The product is then recovered by filtration and washed with water and methyl isobutyl ketone. This product (10.4 g.) is the monohydrate of α-aminobenzylpenicillin·β-naphthalene sulfonic acid salt. The damp filter cake, which contains less than 20% by weight of water, is slurried in 104 ml. of dry acetone. The slurry is stirred for three hours at 25–30° C., filtered, the filter cake is washed with 52 ml. of dry acetone and dried at 50° C. The product, anhydrous α-aminobenzylpenicillin β-naphthalene sulfonate, has an activity of 618 mcg. α-aminobenzylpenicillin/mg. which corresponds to a purity of 99%. It is very heat stable and shows no potency loss after storage for four weeks at 70° C. Exposure to laboratory atmosphere for three days results in no moisture pickup. The product inhibits *Staph. aureus* Smith at a concentration of 0.001% by weight.

Example 7

An aqueous reaction mixture (300 ml.) which has been formed by the acylation of 6-aminopenicillanic acid and which contains α-amino-meta-chlorobenzylpenicillin in admixture with various impurities is filtered. The filtrate (pH 7.1) is adjusted to pH 5.0 and ammonium β-naphthalene sulfonate (2.9 g.) is added with rapid stirring. The pH of the clear, yellow solution is slowly lowered to 2.0 with concentrated H₂SO₄ causing a quantity of oil and gum to separate. The mixture is then layered with 60 ml. of methyl isobutyl ketone and the mixture is stirred vigorously with occasional scratching. In a short time, the β-naphthalene sulfonate of α-amino-meta-chlorobenzylpenicillin crystallizes from the solution. The crystalline product is collected by filtration and, while still slightly damp, is suspended in 75 ml. of water. The pH of the suspension is adjusted to 7.5 by the addition of triethylamine. At first, most of the solid material dissolves. Then, a crystalline material begins to separate. The pH of the mixture is adjusted to 4.3 by the addition of 6 N HCl. After ½ hour, the precipitated crystalline material is collected by filtration, dried overnight in vacuo over P₂O₅. The product (0.90 g.) is determined by infra-red analysis to be substantially pure α-amino-meta-chlorobenzylpenicillin.

Example 8

α-Aminobenzylpenicillin (2 g.) is dissolved in 70 ml. of water and the pH of the solution is adjusted to 7.8 by the addition of NH₄OH. A clear solution results. A solution comprising 2.50 g. of p-nonylbenzene sulfonic acid in 10 ml. of water, the pH of which has been adjusted to 2.5 by the addition of 20% H₂SO₄, is added to the solution of α-aminobenzylpenicillin. There is then added 20 ml. of methyl isobutyl ketone and the pH of the mixture is adjusted to 1.5. Crystal formation commences at this point. The mixture is chilled for one hour, filtered, washed with water and 4 ml. of methyl isobutyl ketone and dried at 50° C. The product (3.45 g.) is the monohydrate of the p-nonylbenzene sulfonic acid salt of α-aminobenzylpenicillin. It has an activity of 535 mcg./mg. and is determined to contain the β-lactam structure by infra-red analysis. The product inhibits *Staph. aureus* Smith at concentrations of 0.001% by weight.

Example 9

α-Aminobenzylpenicillin (2.0 g.) is dissolved in 40 ml. of water having a pH of 7.9. To the clear solution there is added a solution (pH 2.5) of 1.93 g. of sodium p-cymene sulfonate in 10 ml. of water. There are then added to the mixture 20 ml. of methyl isobutyl ketone and the pH of the mixture is adjusted to 1.5. The mixture is chilled, whereupon crystallization occurs. The precipitated product is recovered by filtration, washed with water and Skellysolve B and dried. The product (3.0 g.) is determined by infra-red and elemental analysis to be the trihydrate of p-cymene sulfonic acid salt of α-aminobenzylpenicillin and to have an activity of 610 mcg./mg. The product inhibits *Staph. aureus* Smith at concentrations of 0.001% by weight.

Example 10

α-Aminobenzylpenicillin (2.0 g.) is dissolved in 40 ml. of water having a pH of 7.7. To this clear solution there is added 1.6 g. of sodium toluene sulfonate dissolved in 10 ml. of water. The pH of the clear solution is adjusted to 2.0 and 10 ml. of methyl isobutyl ketone is added. The pH of the mixture is adjusted to 1.5, and the mixture is chilled for one hour whereupon crystallization occurs. The precipitated product is recovered by filtration, washed with water and Skellysolve B and dried. The product (1.6 g.) is found to have an activity of 690 mcg./mg. and is determined to be a α-aminobenzylpenicillin toluene sulfonate. The product inhibits *Staph. aureus* Smith at concentrations of 0.001% by weight.

Example 11

α-Carbobenzyloxyaminophenylacetic acid (0.1 mole), which is obtained by the reaction of equivalent quantities of α-aminophenylacetic acid and benzylchlorocarbonate in aqueous sodium hydroxide, dissolved in dry acetone, is mixed with triethylamine (0.2 mole), stirred and cooled to approximately −5° C. To this there is added dropwise with continued cooling and stirring a solution of ethyl chlorocarbonate (0.1 mole). After approximately ten minutes, the acylating mixture is cooled to about −5° C. and then is slowly added to a stirred ice-cold mixture of 6-aminopenicillanic acid (0.1 mole), 3% sodium bicarbonate solution (0.1 mole) and acetone. This reaction mixture is allowed to attain room temperature, stirred for an additional thirty minutes at this temperature and then is extracted with ether. The extracted aqueous solution is covered with butanol and the pH adjusted to 2 by the addition of N HCl. The acidified aqueous phase is extracted with butanol, the pH of the aqueous phase being adjusted to pH 2 each time. The combined butanol solutions which contain the free acid, α-carbobenzyloxyaminobenzylpenicillin, are washed with water, and are then shaken with water to which sufficient 3% sodium bicarbonate has been added to bring the aqueous phase to pH 7. This process of washing and shaking is repeated with fresh water and bicarbonate solution. The combined aqueous solutions are washed with ether and then are evaporated under reduced pressure and low temperature. The product, the sodium salt of α-carbobenzyloxyaminobenzylpenicillin, is obtained as a yellow solid in a yield of 65 percent.

A suspension of palladium in barium carbonate (3.7 g. of 30%) in water (20 ml.) is shaken in an atmosphere of hydrogen at room temperature. The catalyst is then filtered and washed well with water, care being taken that it does not become dry. A solution of the sodium salt of α-carbobenzyloxyaminobenzylpenicillin (4 g.) in water (20 ml.) is added to the pretreated catalyst and the suspension is shaken in an atmosphere of hydrogen at room temperature and pressure for one hour. The catalyst is then filtered off, washed well with water, and the combined filtrate and washings adjusted to pH 7 with N hydrochloric acid. The solution is then concentrated to about 40 ml. by heating at about 40° C. To the concentrated solution, there is added with agitation a solution of 1.4 g. of β-naphthalene sulfonic acid in 15 ml. of water while the temperature of the concentrate is maintained below 10° C. and the pH is maintained above 1.5 by intermittent addition of triethylamine. Following the addition of the acid solution, the pH of the reaction mixture is adjusted to 1.7, seeded by the addition of β-naphthalene sulfonic acid salt of α-aminobenzylpenicillin and agitated for three hours at 3° C. and at pH 1.7. The monohydrate of α-aminobenzylpenicillin β-naphthalene sulfonate which precipitates is collected by filtration and washed twice with cold water, and with three successive washes of methyl isobutyl ketone. It is found to contain the β-lactam structure as shown by infra-red analysis, inhibits *Staph. aureus* at a concentration of 0.012 mcg./ml., and upon intra-muscular injection in mice, exhibits versus *Staph. aureus* Smith, *Salm. typhimurium* and *Klebs. pneumoniae*, a $CD_{50}$ of 0.05 mg./kg., 35 mg./kg. and 62 mg./kg., respectively.

*Example 12*

A portion of the damp filter cake comprising the monohydrate of α-aminobenzylpenicillin β-naphthalene sulfonate obtained in Example 11 (1.0 g.) which contains less than 20% by weight of water is slurried in 10 ml. of dry acetone. The slurry is stirred for two hours at 30° C., filtered, the filter cake washed with 5 ml. of dry acetone and dried at about 50° C. The product, anhydrous α-aminobenzylpenicillin β-naphthalene sulfonate, has an activity of 618 mcg./mg. It is very heat stable and shows no potency loss after being stored for four weeks at 70° C.

*Example 13*

The product obtained in Example 12 (anhydrous α-amino-benzylpenicillin β-naphthalene sulfonate) is suspended in about 50 ml. of water. The pH of the suspension is adjusted to 7.5 by the addition of triethylamine whereupon a crystalline material begins to separate. The pH of the mixture is then adjusted to about 4.5 by the addition of 6 N HCl. The mixture is allowed to crystallize for about ½ hour and then the precipitated crystalline material is collected by filtration and dried. The product is determined by infra-red analysis to be subtantially pure α-aminobenzylpenicillin.

*Example 14*

When in the procedure of Example 11 the α-carbobenzyloxyaminophenylacetic acid is replaced by 0.1 mole of α-Carbobenzyloxyamino-4-diethylaminophenylacetic acid,
α-Carbobenzyloxyamino-4-trifluoromethylphenylacetic acid,
α-Carbobenzyloxyamino-3-methylphenylacetic acid,
α-Carbobenzyloxyamino-4-sulfamylphenylacetic acid,
α-Carbobenzyloxyamino-4-t-butylphenylacetic acid, and
α-Carbobenzyloxyamino-2-acetamidophenylacetic acid, respectively, the following compounds or hydrates thereof are produced:

α-Amino-4-diethylaminobenzylpenicillin β-naphthalene sulfonate,
α-Amino-4-trifluoromethylbenzylpenicillin β-naphthalene sulfonate,
α-Amino-3-methylbenzylpenicillin β-naphthalene sulfonate,
α-Amino-4-sulfamylbenzylpenicillin β-naphthalene sulfonate,
α-Amino-4-t-butylbenzylpenicillin β-naphthalene sulfonate, and
α-Amino-2-acetamidobenzylpenicillin β-naphthalene sulfonate.

*Example 15*

Replacement of the α-aminobenzylpenicillin β-naphthalene sulfonate in Example 13 with α-Amino-4-diethylaminobenzylpenicillin β-naphthalene sulfonate,
α-Amino-4-trifluoromethylbenzylpenicillin β-naphthalene sulfonate,
α-Amino-2,4-dibromobenzylpenicillin β-naphthalene sulfonate,
α-Amino-2-nitrobenzylpenicillin β-naphthalene sulfonate,
α-Amino-3-methylbenzylpenicillin β-naphthalene sulfonate,
α-Amino-4-sulfamylbenzylpenicillin β-naphthalene sulfonate,
α-Amino-2-iodobenzylpenicillin β-naphthalene sulfonate,
α-Amino-4-t-butylbenzylpenicillin β-naphthalene sulfonate, and
α-Amino-2-acetamidobenzylpenicillin β-naphthalene sulfonate, respectively, results in the formation of the corresponding α-Amino-4-diethylaminobenzylpenicillin,
α-Amino-4-trifluoromethylbenzylpenicillin,
α-Amino-2,4-dibromobenzylpenicillin,
α-Amino-2-nitrobenzylpenicillin,
α-Amino-3-methylbenzylpenicillin,
α-Amino-4-sulfamylbenzylpenicillin,
α-Amino-2-iodobenzylpenicillin,
α-Amino-4-t-butylbenzylpenicillin, and
α-Amino-2-acetamidobenzylpenicillin.

*Example 16*

When in the procedure of Example 11, the β-naphthalene sulfonic acid is replaced by an equivalent molar amount of p-Chlorobenzene sulfonic acid,
m-Nitrobenzene sulfonic acid,
6,7-dihydroxy-3-naphthalene sulfonic acid,
4-acetamidobenzene sulfonic acid,
2,4-dimethylbenzene sulfonic acid,
p-Methoxybenzene sulfonic acid, and
p-Acetoxybenzene sulfonic acid, respectively, the following compounds or hydrates thereof are produced:

α-Aminobenzylpenicillin-p-chlorobenzene sulfonate,
α-Aminobenzylpenicillin-m-nitrobenzene sulfonate,
α-Aminobenzylpenicillin-6,7-dihydroxy-2-naphthalene sulfonate,
α-Aminobenzylpenicillin-4-acetamidobenzene sulfonate,
α-Aminobenzylpenicillin-2,4-dimethylbenzene sulfonate,
α-Aminobenzylpenicillin-p-methoxybenzene sulfonate, and
α-Aminobenzylpenicillin-p-acetoxybenzene sulfonate.

We claim:
1. A member selected from the group consisting of

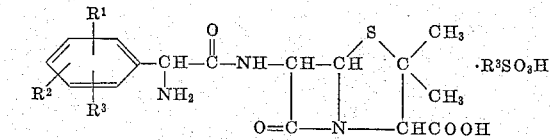

wherein $R^1$, $R^2$ and $R^3$ each represents a member selected from the group consisting of hydrogen, nitro, di(lower) alkylamino, (lower)alkanoylamino, (lower)alkanoyloxy, (lower)alkyl, (lower)alkoxy, sulfamyl, chloro, iodo, bromo, fluoro, trifluoromethyl; and their sodium, potassium, calcium, aluminum and ammonium salts, their nontoxic salts with an amine selected from the group consisting of tri(lower) alkylamines, procaine, dibenzylamine, N-benzyl-beta-phenethylamine, 1-ephenamine, N,N'-dibenzylethylenediamine, dehydroabietylamine, N,N'-bis-dehydroabietylethylenediamine and N-(lower)alkylpiperidine, and wherein $R^4$ represents a member selected from the group consisting of radicals having the formulae

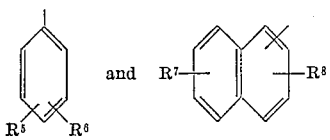

in which $R^5$, $R^6$, $R^7$ and $R^8$ are members selected from the group consisting of hydrogen, alkyl containing from 1 to 12 carbon atoms, (lower)alkoxy, nitro, (lower)alkanoylamino, chloro, iodo and bromo.

2. α-Aminobenzylpenicillin β-naphthalene sulfonate.

3. α-Amino-m-chlorobenzylpenicillin β-naphthalene sulfonate.

4. α-Aminobenzylpenicillin p-nonylbenzene sulfonate.

5. α-Aminobenzylpenicillin p-cymene sulfonate.

6. α-Aminobenzylpenicillin p-toluene sulfonate.

7. A process which comprises:
providing an aqueous solution containing an α-aminobenzyl-penicillin selected from the group consisting of the acids having the formula

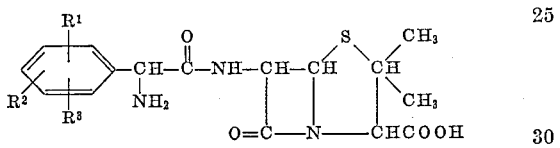

wherein $R^1$, $R^2$ and $R^3$ each represents a member selected from the group consisting of hydrogen, nitro, di(lower)alkylamino, (lower)alkanoylamino, (lower)alkanoyloxy, (lower)alkyl, (lower)alkoxy, sulfamyl, chloro, iodo, bromo, fluoro, trifluoromethyl; and their sodium, potassium, calcium, aluminum and ammonium salts, their nontoxic salts with an amine selected from the group consisting of tri(lower)alkylamines, procaine, dibenzylamine, N-benzylbetaphenethylamine, 1-ephenamine, N,N'-dibenzylethylenediamine, dehydroabietylamine, N,N'-bis-dehydroabietylethylenediamine, and N-(lower)alkylpiperidine;
contacting said solution at about 0° C. to 50° C. with a water-soluble aryl sulfonic acid having the formula $(R^4—SO_3)_x M$ wherein M is a radical selected from the group consisting of hydrogen, ammonium, the alkali metals and the alkaline earth metals, wherein $x$ is a whole number equal to the valence of M and wherein $R^4$ represents a member selected from the group consisting of radicals having the formulae

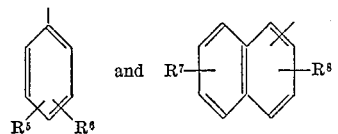

in which $R^5$, $R^6$, $R^7$ and $R^8$ are members selected from the group consisting of hydrogen, alkyl containing from 1 to 12 carbon atoms, (lower)alkoxy, nitro, (lower)alkanoylamino, chloro, iodo, and bromo;
adjusting the pH of the reaction mixture to within the range of from about 1.5 to 3.5 whereby a reaction product of said α-aminobenzylpenicillin and said aryl sulfonic acid is formed;
and recovering said reaction product.

8. The process of claim 7 wherein said α-aminobenzylpenicillin is α-aminobenzylpenicillin and wherein said aryl sulfonic acid is β-naphthalene sulfonic acid.

9. A process for the recovery of an α-aminobenzylpenicillin from an impure solution thereof which comprises:
providing an impure aqueous solution containing an α-aminobenzylpenicillin selected from the group consisting of the acids having the formula

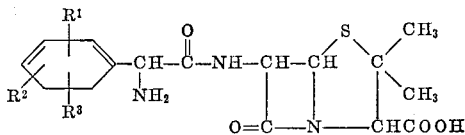

wherein $R^1$, $R^2$ and $R^3$ each represents a member selected from the group consisting of hydrogen, nitro, di(lower)alkylamino, (lower)alkanoylamino, (lower)alkanoyloxy, (lower)alkyl, (lower)alkoxy, sulfamyl, chloro, iodo, bromo, fluoro, trifluoromethyl, and their water soluble salts;
adding to said aqueous solution an organic water immiscible solvent to form a mixture;
contacting said mixture at about 0° C. to 50° C. with a water-soluble aryl sulfonic acid selected from the group consisting of β-naphthalene sulfonic acid, p-nonylbenzene sulfonic acid, p-cymene sulfonic acid, p-toluene sulfonic acid and their ammonium and alkali metal salts;
adjusting the pH of said mixture to within the range of from about 1.5 to 3.5 whereby a crystalline reaction product of said an α-aminobenzylpenicillin and said aryl sulfonic acid is formed;
recovering said crystalline reaction product; suspending said reaction product in water, adjusting the pH of said suspension to within the range of from about 6.0 to 8.0 and recovering the resultant an α-aminobenzylpencillin.

10. The process of claim 9 wherein said an α-aminobenzylpenicillin is α-aminobenzylpenicillin and wherein said aryl sulfonic acid is β-naphthalene sulfonic acid.

11. The process of claim 10 wherein said recovered crystalline reaction product of said an α-aminobenzylpenicillin and said arylsulfonic acid is slurried in acetone and subsequently recovered therefrom.

12. The process of claim 9 wherein said aryl sulfonic acid is contacted with said mixture at a temperature between about 0 and 10° C. and wherein the pH of said mixture is from 1.5 to 2.0.

13. The process of claim 9 wherein said recovered reaction product is suspended in water, the pH of said suspension is adjusted to within the range of 6.7 to 7.2 and subsequently to about 4.5 to 4.6.

14. A process for the production of the anhydrous β-naphthalene sulfonic acid salt of an α-aminobenzylpenicillin which comprises:
providing an aqueous solution containing an α-aminoenbzylpenicillin selected from the group consisting of the acids having the formula

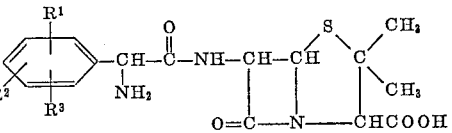

wherein $R^1$, $R^2$ and $R^3$ each represents a member selected from the group consisting of hydrogen, nitro, di(lower)alkylamino, (lower)alkanoylamino, (lower)alkanoyloxy, (lower)alkyl, (lower)alkoxy, sulfamyl, chloro, iodo, bromo, fluoro, trifluoromethyl, and their sodium, potassium, calcium, aluminum and ammonium salts, their nontoxic substituted ammonium salts with an amine selected from the group consisting of tri(lower)alkylamines, procaine, dibenzylamine, N - benzyl - beta - phenethylamine, 1-ephenamine, N,N'-dibenzylethylenediamine, dehydroabietylamine, N,N' - bis-dehydroabietyl-ethylenediamine and N-(lower)alkylpiperidine;
contacting said solution at about 0° C. to 50° C. with β-naphthalene sulfonic acid;
adjusting the pH of the reaction mixture to within the range of from about 1.5 to 3.5 whereby the monohydrate of said an α-aminobenzylpenicillin β-naphthalene sulfonate is formed:

recovering said monohydrate, slurrying said monohydrate in acetone and subsequently recovering from said slurry the anhydrous β-naphthalene sulfonic acid salt of said α-aminobenzylpenicillin.

15. The process of claim 14 wherein said an α-aminobenzylpenicillin is α-aminobenzylpenicillin.

References Cited by the Examiner
UNITED STATES PATENTS

| | | | |
|---|---|---|---|
| 2,223,935 | 12/40 | Daniels et al. | 260—501 |
| 2,876,236 | 3/59 | Szabo et al. | 260—239.1 |
| 2,985,648 | 5/61 | Doyle et al. | 260—239.1 |
| 3,157,640 | 11/64 | Johnson et al. | 260—239.1 |

References Cited by the Applicant
UNITED STATES PATENTS

| | | |
|---|---|---|
| 2,223,935 | 12/40 | Daniels et al. |
| 2,876,236 | 3/59 | Szabo et al. |
| 2,985,648 | 5/61 | Doyle et al. |

OTHER REFERENCES

Aldrich Chemical Company, Inc., Catalog No. 11, pages 338–346 (1963).

Distillation Products Industries, "Eastman Organic Chemicals Classified by Functional Groups No. 2F," pages 53–55 (1963).

NICHOLAS S. RIZZO, *Primary Examiner.*

UNITED STATES PATENT OFFICE
CERTIFICATE OF CORRECTION

Patent No. 3,180,862                                        April 27, 1965

Herbert H. Silvestri et al.

It is hereby certified that error appears in the above numbered patent requiring correction and that the said Letters Patent should read as corrected below.

Column 2, lines 16 to 21, column 11, lines 25 to 30, and column 12, lines 3 to 8, the formula, each occurrence, should appear as shown below instead of as in the patent:

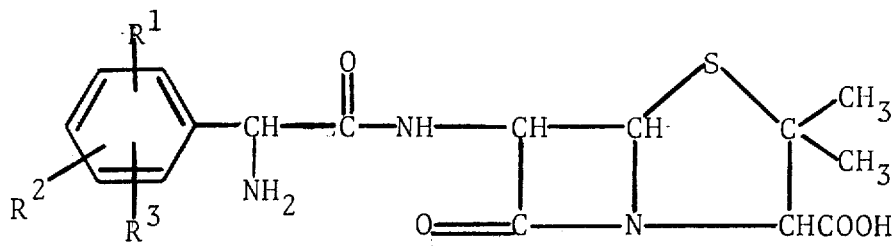

column 2, line 35, for "N-benzylbeta-phenethylamine" read -- N-benzyl-beta-phenethylamine --; column 4, line 34, for "untli" read -- until --; column 10, lines 58 to 62, the formula should appear as shown below instead of as in the patent:

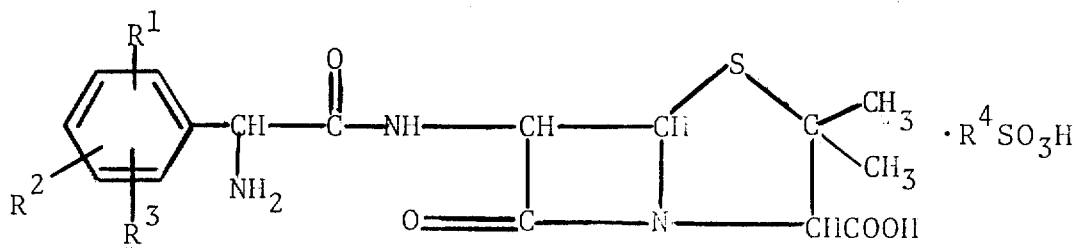

Signed and sealed this 5th day of October 1965.

(SEAL)
Attest:

ERNEST W. SWIDER                              EDWARD J. BRENNER
Attesting Officer                               Commissioner of Patents